June 13, 1950 — L. DARCANGELO — 2,511,623
KEG TRUCK
Filed March 27, 1948

INVENTOR.
LEONARD DARCANGELO
BY David H. Ekroad,
   Attorney.

Patented June 13, 1950

2,511,623

UNITED STATES PATENT OFFICE 2,511,623

KEG TRUCK

Leonard Darcangelo, Cleveland, Ohio

Application March 27, 1948, Serial No. 17,420

2 Claims. (Cl. 214—65.4)

My invention relates to improvements in, or a new type of, keg truck.

The principal object of my invention is to provide a one-man truck, of simple and inexpensive construction for lifting and transporting kegs of different sizes conveniently and easily, and when a keg is mounted on the truck it will be held securely in position and prevented from slipping while being moved, or transported.

The principal features of my invention, or device, are shown in the accompanying drawings, in which.

Figure 1:
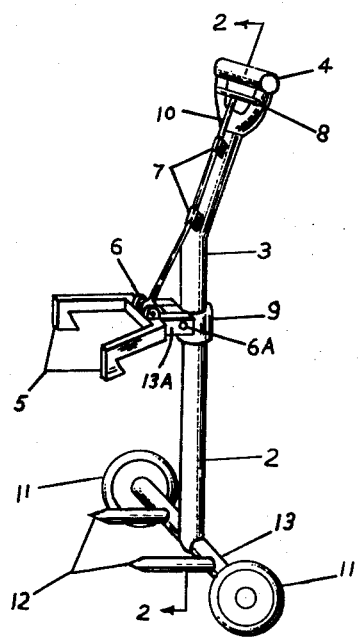
Fig. 1 is a perspective view of the complete device, or truck.
Figure 2:
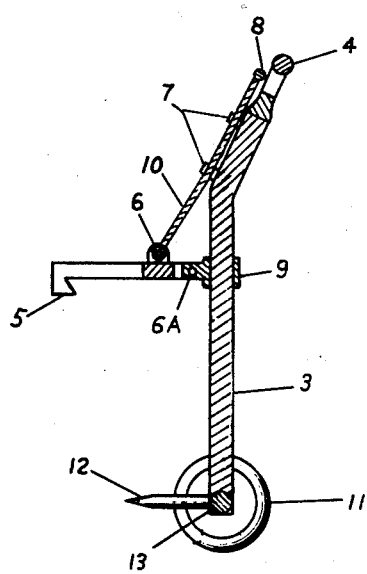
Fig. 2 is an elevation view of the device, or truck, in section.

In the drawings, 2 is the device, or truck, 3 is the center shaft, attached rigidly to the axle 13, equidistant from each end thereof, and the upper portion, bent at an angle in line with lower portion and having a handle 4, 5 is a set of tentacles, or grappling hooks, with extensions, or ears, 13A, and being integral with 5, 13A is attached to collar 9 by means of pins 6A which permit 13A with 5, free to move up and down, 9 is rigidly fixed on 3, 10 is a lever, or rod, attached on 3 by means of the straps 7, which allow 10 to slide, or move, up and down, 10 is connected to 5 by means of a pin 6 which allows 5 to be raised, or lowered, in order to engage top of keg, to be moved, and hold keg securely on truck after it is mounted on same, 11 are wheels, preferably with rubber tires, securely fitted on ends of axle 13, and 12 are pointed forks for engaging the sides of, or underneath, keg.

It will be observed that the use and operation of applicant's device is much different from other similar devices, when it is desired to load the device, it is moved up to the object desired to be moved, whether it be a key, barrel, box or carboy. The pointed prongs 12 are forced lightly in the sides or walls of such object in place of the operator having to lean such object forward so that the lifting member can be extended underneath such object. The object to be moved is then also secured on the device at the top by the grappling arms 5, such arms being pivoted at their inner end so that they can be moved upward and downward in a vertical plane by means of a manually operated means 10, the object is thus securely loaded on the device. It will also be noted that the grappling members 5 are movable up and down independently of each other. The upper portion of the handle being formed at an angle that makes for ease in operating the device as well as convenient in adjusting the grappling arms.

Having described my invention and its operation, I claim:

1. A truck of the character described, comprising a horizontal axle with a wheel mounted rotatable at either end thereof, said wheels adapted to support such truck movable on a surface, an elongated handle member fixed rigidly to such axle equidistant from the ends thereof and extending upward vertical to said axle, the upper portion of said handle member being inclined outward from remaining vertical portion of such handle member, two pointed prongs of equal length fixed apart on said axle and extending laterally outward and parallel, a sliding bar attached on the upper inclined portion of said handle, a cross member attached on the lower end of such sliding bar, grappling means attached movable on said cross member.

2. A truck of the character described, comprising the structure set forth in claim 1, said sliding bar adapted to slide lengthwise of such handle by manual means, said grappling means consisting of two complementary hooks adapted to be adjusted upward and downward by means of the said sliding bar.

LEONARD DARCANGELO.

REFERENCES CITED

The following references are of record in the file of this patent:

UNITED STATES PATENTS

| Number | Name | Date |
|---|---|---|
| 1,165,076 | Curtis | Dec. 21, 1915 |
| 1,470,526 | Cade | Oct. 9, 1923 |
| 2,329,439 | Hanssen | Sept. 14, 1943 |
| 2,417,918 | Fatur | Mar. 25, 1947 |